United States Patent [19]

Sato et al.

[11] Patent Number: 5,016,800
[45] Date of Patent: May 21, 1991

[54] METHOD OF CUTTING WORKPIECE

[76] Inventors: Yasuo Sato, 9-8, Kami-Takaido 2-Chome, Suginami-ku, Tokyo-to; Kunio Saeki, 18-7, Higashi-Tamagawagakuen 1-Chome, Machida-shi, Tokyo-to, both of Japan

[21] Appl. No.: 572,339

[22] Filed: Aug. 23, 1990

Related U.S. Application Data

[63] Continuation of Ser. No. 149,727, Jan. 29, 1988, abandoned.

[30] Foreign Application Priority Data

Sep. 10, 1987 [JP] Japan ............................ 62-227185

[51] Int. Cl.$^5$ ............................................. C03B 33/03
[52] U.S. Cl. .................................... 225/2; 225/96.5; 225/103
[58] Field of Search ..................... 225/2, 93, 96, 96.5, 225/103

[56] References Cited

U.S. PATENT DOCUMENTS 3,559,855  2/1971  Barnett et al. ..................... 225/2
3,578,227  5/1971  Gehri ................................. 225/2
4,106,683  8/1978  Gulish, Jr. ....................... 225/96.5
4,225,072  9/1980  Reeves ............................ 225/96.5

FOREIGN PATENT DOCUMENTS 742809  1/1956  United Kingdom ................. 225/93

Primary Examiner—Hien H. Phan
Attorney, Agent, or Firm—Michael N. Meller

[57] ABSTRACT

A method for cutting workpiece made of such a glass or ceramic material having relatively large thickness. A workpiece having one surface on which an incision is previously formed is placed on a flat plate which has a Young's modulus smaller than that of the workpiece and which is placed on a surface plate, so that the surface having the incision of the workpiece faces the upper surface of the flat plate. A pressing load is then applied downwardly through a pressing member to the surface opposite to the surface having the incision of the workpiece locally along the incision. The workpiece is thus cut by the bending moment due to the difference of the Young's moduli of the workpiece and the flat plate without generating noises or forming chips.

6 Claims, 1 Drawing Sheet

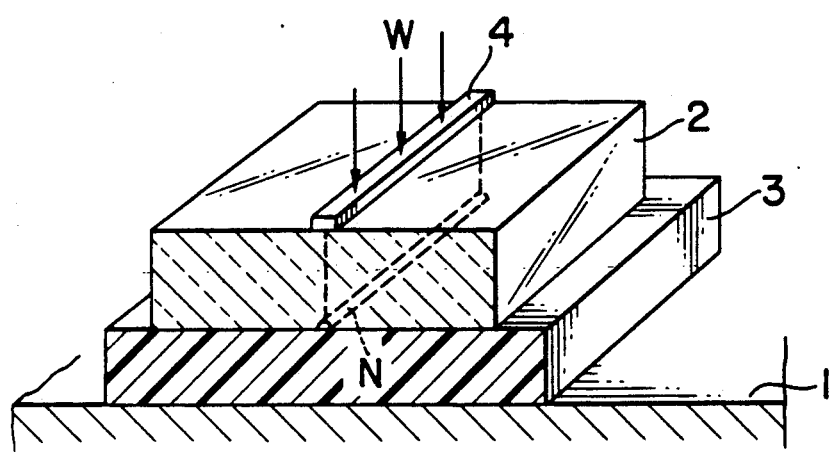

METHOD OF CUTTING WORKPIECE

This application is a continuation of application Ser. No. 149,727, filed Jan. 29, 1988 now abandoned.

BACKGROUND OF THE INVENTION

This invention relates to a method of cutting a workpiece such as glass plate or ceramic plate.

In a known technique in the field of cutting workpieces, a workpiece such as glass plate or ceramic plate has generally been cut by the steps of previously marking an incision on one surface of the workpiece making use of, for example, a cutter provided with a diamond point blade (hereinafter called "diamond point cutter"), holding both sides of workpiece having incision in the center thereof, and applying a bending moment to the incision portion.

In the cutting technique described above utilizing the bending moment, the cutting operation of a relatively thin workpiece is easily achieved. However, the cutting operation of a large workpiece, particularly, a thick plate having a thickness of more than 15 mm, can hardly be achieved.

SUMMARY OF THE INVENTION

An object of this invention is to eliminate the defects or drawbacks in the prior art technique and to provide a method of easily cutting a workpiece such as glass plate having a relatively large thickness.

Another object of this invention is to provide a method of cutting a workpiece made, for example, of glass material having a solid circular cylindrical configuration, square cylindrical configuration, or other shapes without generating noise or forming chips.

These and other objects can be achieved according to this invention by providing a method of cutting a workpiece made, for example, of such as a glass material wherein the workpiece has one surface on which the incision is previously prepared. Here a flat plate having a Young's modulus smaller than that of the workpiece is placed on a surface plate. The workpiece is then placed on the flat plate so that the one surface having the incision faces the upper surface of the flat plate, and then a load is applied downwardly to the opposite surface of the workpiece locally along the shape of the incision, thereby cutting the workpiece along the incision.

BRIEF DESCRIPTION OF THE DRAWING

The drawing is a perspective view of a flat plate on which a workpiece to be cut according to the method of this invention is placed.

DESCRIPTION OF THE PREFERRED EMBODIMENT

An embodiment of this invention will be described further in detail hereunder with reference to the accompanying drawing.

Referring to FIG. 1, a flat plate 3 is placed on a surface plate 1, and a workpiece, a glass plate 2 in accordance with this embodiment, to be cut is placed on the flat plate 3. The flat plate 3 is made of synthetic resin, for example, having a Young's modulus $E_2$ smaller than that of the glass plate 2.

Incision N of desired shape to be cut is previously marked by means of a tool such as diamond point cutter on one surface of the glass plate 2 directly facing the upper surface of the flat plate 3. A flat elongated ribbon-shape pressing member 4 is disposed on the upper surface of the glass plate 2 so as to lie along the incision N.

Under these conditions, when a pressing load (w) is applied to the pressing member 4 downwardly as shown in the drawing the glass plate 2 is cut along the incision N.

More specifically, when the pressing load (w) is applied to the pressing member 4 by a known means, not shown, the glass plate 2 is subjected to a local downward compression force along the incision N, and hence, the flat plate 3 is also locally compressed downwardly. The locally compressed portion of the flat plate 3 is largely shrunk in the direction of the thickness in comparison with the uncompressed portion, thereof, because the flat plate 3 having the Young's modulus $E_2$ smaller than that $E_1$ of the glass plate 2 is disposed between the glass plate 2 and the surface plate 1.

Accordingly, a bending moment in proportion to the pressing load (w) occurs in the glass plate 2 and the tensile stress due to this bending moment becomes maximum along the incision N, thereby breaking and finally cutting the glass plate 2 along the incision N.

As described above, according to the method of this invention, a workpiece which was hardly cut using the conventional cutting technique can be easily cut with smooth cut surfaces by increasing the pressing load.

Several experimental tests performed in accordance with the method of this invention to cut glass plates will be described hereunder as Examples I through IV.

In Examples I, II and III, an acrylic resin plate was used having a thickness of 5 mm (cross section: 5 mm × 5 mm) and having a Young's modulus $E_2$ of about 340 kgf/mm$^2$, which is smaller than the Young's modulus of about 700 kgf/mm$^2$ of glass, to satisfy the relationship $E_2 < E_1$. In Example IV, an aluminum piece having a cross section with a width of 8 mm and a thickness of 2 mm and having a Young's modulus of about 7,000 kgf/mm$^2$ is used as a flat plate.

In any Example, the incision to be cut therealong is made by means of a known glass cutter such as diamond point cutter.

EXAMPLE I

A soda glass plate in the form of a square having the respective side lengths of 50 mm was cut into two equal parts according to the method of this invention so as to have a cross section parallel to the side of the square plate. The relationship between the glass thickness (h) and the pressing load (w) was as follows.

| Thickness (h) | Pressing Load (w) |
|---|---|
| 10 mm | about 180 kgf |
| 16 mm | about 610 kgf |
| 20 mm | about 1120 kgf |

EXAMPLE II

A soda glass plate in the form of a square having a thickness (h) of 20 mm was cut into two equal parts along the diagonal direction on one surface of the glass plate according to the method of this invention to obtain two prisms. The relationship between the pressing load (w) and the side length (a) of the square glass plate was as follows.

| Side Length (a) | Pressing Load (w) |
| --- | --- |
| 20 mm | about 670 kgf |
| 40 mm | about 1200 kgf |
| 60 mm | about 1500 kgf |

EXAMPLE III

A solid circular cylinder of Pyrex (Trade Name) glass having a diameter of 25 mm and a height of 26 mm was cut into two equal parts along a plane including a central axis of the glass cylinder according to the method of this invention to obtain two equal semicircular columns. The pressing load (w) in this cutting operation was about 1200 kgf.

EXAMPLE IV

A glass plate having a relatively large thickness, for example, a soda glass plate having a width of 20 mm and a thickness of 40 mm, was cut into two equal parts along a plane passing through the central portion of the longitudinal length (a) of the glass plate according to the method of this invention. The relationship between the length (a) and the pressing load (w) was as follows.

| Longitudinal Length (a) | Pressing Load (w) |
| --- | --- |
| 80 mm | about 680 kfg |
| 40 mm | about 1040 kgf |

In all experimental examples, the cutting operations could be performed without causing noise of cutting chips or the like. The cut surfaces of the workpieces were smooth like mirror surfaces in a macroscopic view.

In the foregoing descriptions, this invention is described in accordance with a preferred embodiment in which a glass plate is cut along a straight incision by utilizing a pressing member such as a ribbon member having a shape corresponding to the straight incision, but according to another modification, a glass plate may be cut along a curved incision preferably by using a pressing member having a shape corresponding to the curved incision.

According to the method of this invention, a pressing load is locally applied to a workpiece to be cut placed on a flat plate, thereby inducing the bending moment in the workpiece in proportion to the pressing load due to the difference of the Young's moduli of the workpiece and the flat plate. Accordingly, the tensile stress due to the bending moment becomes maximum along the incision previously formed on the workpiece surface. Thus cutting of the workpiece, which has a relatively large thickness and is hardly cut by the prior art cutting technique, can easily be achieved along the incision with a smooth cut surface after cut.

Moreover, according to the cutting method of the invention, prisms can easily be obtained with smooth cut surfaces by cutting a square glass plate having a relatively large thickness along a diagonal direction on one surface thereof. A solid circular cylinder can also be cut along a plane including a central axis thereof. In addition, during the cutting operation according to the method of this invention, substantially no noise is generated nor are any chips formed.

What is claimed is:

1. A method of cutting a workpiece comprising the steps of:

preparing a workpiece having a substantially flat surface on which an incision is previously formed;

placing a flat plate having a Young's modulus smaller than that of said workpiece on a surface plate;

placing said workpiece in full contact on said flat plate so that said one surface having the incision thereon of said flat plate; and applying a pressing load downwardly to a surface opposite to the surface having the incision thereon of said workpiece locally along a shape of the incision, thereby cutting the workpiece along the incision.

2. The method according to claim 1 wherein said workpiece is made of a glass material and said flat plate is made of a synthetic resin.

3. The method according to claim 1 wherein the application of the pressing load to the upper surface of said workpiece is performed through a pressing member which has a shape corresponding to the shape of the incision and which is located on the upper surface of the workpiece.

4. The method according to claim 3 wherein said pressing member is a ribbon like plate and said incision is formed as a straight line.

5. The method according to claim 2 wherein said workpiece is a square glass plate and said incision is formed on one surface of said workpiece in a diagonal direction to obtain two prisms with smooth cut surfaces after cut.

6. The method according to claim 2 wherein said workpiece is a solid circular glass cylinder and incision passing through a central point of one end surface of said workpiece is formed to obtain two semicircular glass cylinder after cut.

* * * * *